United States Patent [19]
Borthick et al.

[11] Patent Number: 5,555,699
[45] Date of Patent: Sep. 17, 1996

[54] CROSS-STIFFENED PANEL STRUCTURE

[75] Inventors: William R. Borthick, Glenpool; Steven J. Fujan, Tulsa, both of Okla.

[73] Assignee: Terex Corporation, Green Bay, Wis.

[21] Appl. No.: 418,176

[22] Filed: Apr. 6, 1995

[51] Int. Cl.⁶ .................................................. E04C 2/38
[52] U.S. Cl. ............... 52/801.11; 52/668; 52/799.13; 108/51.1; 403/41; 403/237; 403/400
[58] Field of Search ........................ 52/664, 665, 667, 52/668, 783.18, 787.12, 793.11, 798.1, 799.1, 799.11, 799.12, 799.13, 799.14, 800.1, 801.1, 801.11; 108/51.1, 56.1; 403/41, 237, 389, 400

[56] References Cited

U.S. PATENT DOCUMENTS

| | | |
|---|---|---|
| 1,339,912 | 5/1920 | Ambursen. |
| 1,887,814 | 11/1932 | Le Gall ................................ 52/793.11 |
| 2,196,615 | 4/1940 | Surprenant. |
| 2,229,888 | 1/1941 | Fraser ...................................... 105/410 |
| 2,260,590 | 10/1941 | Speck. |
| 2,511,620 | 6/1950 | Clements ........................ 52/799.14 X |
| 2,628,144 | 2/1953 | Loetscher. |
| 2,657,645 | 11/1953 | Ecoff ............................... 52/801.11 X |
| 2,863,503 | 12/1958 | Stroup. |
| 2,873,008 | 2/1959 | Ashman. |
| 3,094,351 | 6/1963 | Gwinn. |
| 3,113,532 | 12/1963 | White ................................ 108/56.1 X |
| 3,306,654 | 2/1967 | Curcio. |
| 3,462,187 | 8/1969 | Hassler. |
| 3,472,548 | 10/1969 | Comisac. |
| 3,499,678 | 3/1970 | Richler. |
| 3,740,916 | 6/1973 | Kenaga. |
| 3,759,006 | 9/1973 | Tamboise ......................... 52/798.1 X |
| 3,807,116 | 4/1974 | Flynn .............................. 52/799.14 X |
| 3,897,972 | 8/1975 | Logue. |
| 4,273,381 | 6/1981 | Bibeau et al.. |
| 4,573,304 | 3/1986 | Mieyal .................................. 52/793.11 |
| 4,832,309 | 5/1989 | Derby-Lewis .................. 52/801.11 X |
| 5,157,892 | 10/1992 | Ryther ............................ 52/799.14 X |

*Primary Examiner*—Carl D. Friedman
*Assistant Examiner*—Kevin D. Wilkens
*Attorney, Agent, or Firm*—Head, Johnson & Kachigian

[57] ABSTRACT

An improved cross-stiffened panel structure, such as used on bridges, load bearing floors, large haulage containers and dump trucks, is composed of a deck plate to which are attached a plurality of spaced apart stiffening ribs. A plurality of transverse beams, each having a cut-out shaped to fit over the external contour of the stiffening ribs, are welded to the deck plate except at the cut-outs. The cut-outs are dimensioned so that a nominal gap is maintained between the cut-outs and the stiffening ribs. In another embodiment, saddles are fabricated to fit over the stiffening ribs and welded to the deck plate while maintaining a nominal gap between the stiffening ribs and the saddles. The transverse beams cut-outs conform to the contour of the saddles and the transverse beams are welded to the deck plate and the saddles.

2 Claims, 3 Drawing Sheets

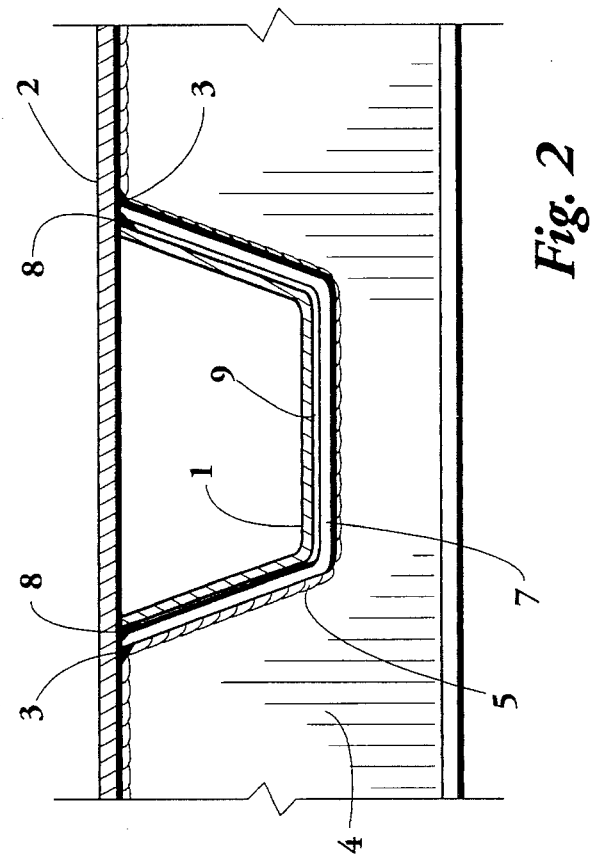
Fig. 1 *(PRIOR ART)*
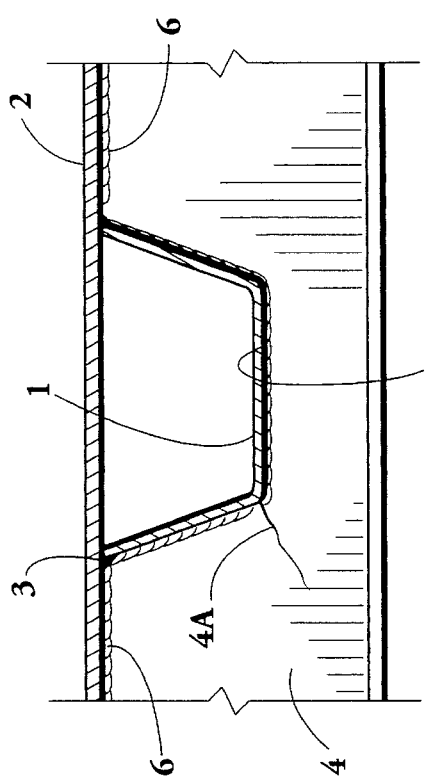
Fig. 2
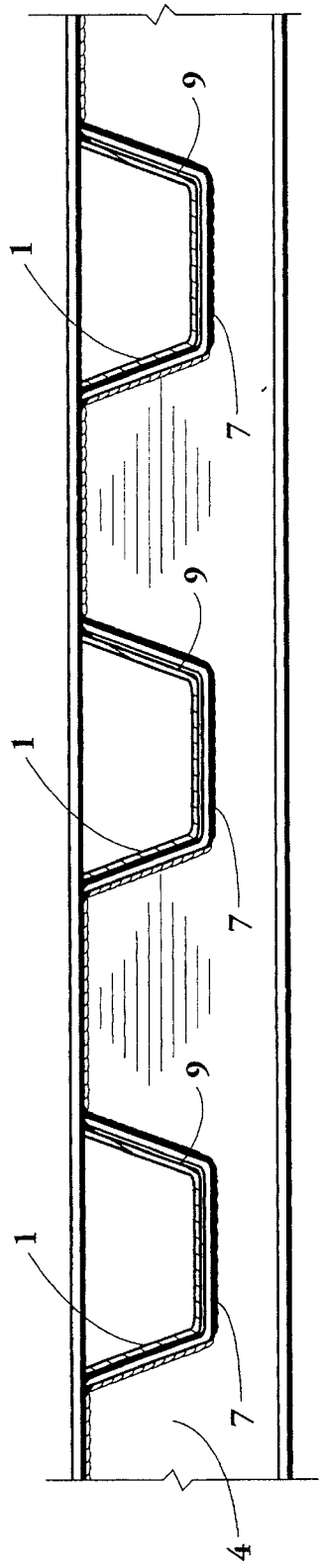
Fig. 3

CROSS-STIFFENED PANEL STRUCTURE

BACKGROUND OF THE INVENTION

1. Field of the Invention

The present invention relates to a stiffened panel structure for use in bridges, load bearing floors, large haulage containers, dump trucks or other structures where panel stiffening is advantageous.

A panel that must support weight is heavy due to its own thickness and inherent weight. A more efficient means of achieving the load support and yet provide the requisite panel strength, is to utilize a thinner panel with a reinforcing substructure. In this manner a thinner, lighter weight panel may be obtained, that will yet provide the rigidity and strength required. One of the methods of providing a reinforcing substructure is to attach a series of cross-aligned beams to the panel.

One set of support beams aligned parallel to each other are referred to as stiffening ribs. Another set of support beams aligned parallel to each other but generally perpendicular to the stiffening ribs are referred to as transverse beams.

The stiffening ribs may be of differing cross-sectional shapes but are most generally a formed channel. The stiffening ribs are then welded to the panel. Transverse beams may also be of varying cross-sectional shapes but are generally a fabricated channel. The transverse beams are generally deeper in cross-section than the stiffening ribs and thus include cut-outs that allow them to fit over the stiffening ribs. The transverse beams are then welded onto the panel and the stiffening ribs.

The interaction between the deformation of the stiffening ribs and the transverse beams results in abnormally high stresses and a susceptibility to fatigue of the structure, particularly at the point on the transverse beam where the stiffening ribs are welded to the transverse beams. Load stresses have caused cracks to appear in the transverse beam and propagate across the section of the transverse beam resulting in shorter service life, reduced load bearing capacity or both.

It is therefore an object of the present invention to provide an improved cross-stiffened panel structure. The resulting structure would have a longer fatigue life or could be fabricated from thinner material with a more efficient structure obtained.

SUMMARY OF THE INVENTION

A reinforced panel structure in accordance with the invention comprises a deck plate to which are attached or welded a series of stiffening ribs. The stiffening ribs are formed in the shape of a channel with the ends thereof welded to the panel. Additionally transverse beams are fabricated in a channel form, consisting of a flange and two webs. Cut-outs in the transverse beam are fabricated so that the transverse beams may fit over the stiffening ribs. The improvement requires the addition of saddles, formed or fabricated to a shape that allows the saddle to fit over the stiffening ribs. The saddle is attached to the transverse beam by welding along the cut-out edge. The ends of the saddles are welded to the deck plate while maintaining a nominal gap between the stiffening ribs and the saddles. The cutouts in the transverse beams are made to conform to the contour of the saddles and the transverse beams are welded to the deck plate and the saddles, instead of the deck plate and the stiffening ribs. A nominal gap still exists between the saddles and the stiffening ribs. The saddle substitutes for the stiffening ribs in maintaining the structural integrity of the transverse beam.

The result of the new configuration is a stiffening rib that passes through a cut-out in each transverse beam, but without being joined to the transverse beam. This isolates the stiffening ribs from the transverse beam thereby eliminating the interaction and combined loading stresses that previously existed at the stiffening rib transverse beam interface, and overcomes the deleterious effects of such stresses such as fatigue cracks.

BRIEF DESCRIPTION OF THE DRAWINGS

FIG. 1 illustrates a cross-section of a stiffening rib welded to the transverse beam as utilized in the prior art. A usual crack initiation due to fatigue failure is shown in this Figure.

FIG. 2 illustrates a cross-section of a stiffening rib with a saddle welded to the transverse beam in accordance with the invention.

FIG. 3 illustrates a cross-section along a transverse beam to which are welded saddles which are assembled over a number of stiffening ribs in accordance with the invention.

DETAILED DESCRIPTION OF THE PREFERRED EMBODIMENTS

Figure 4:
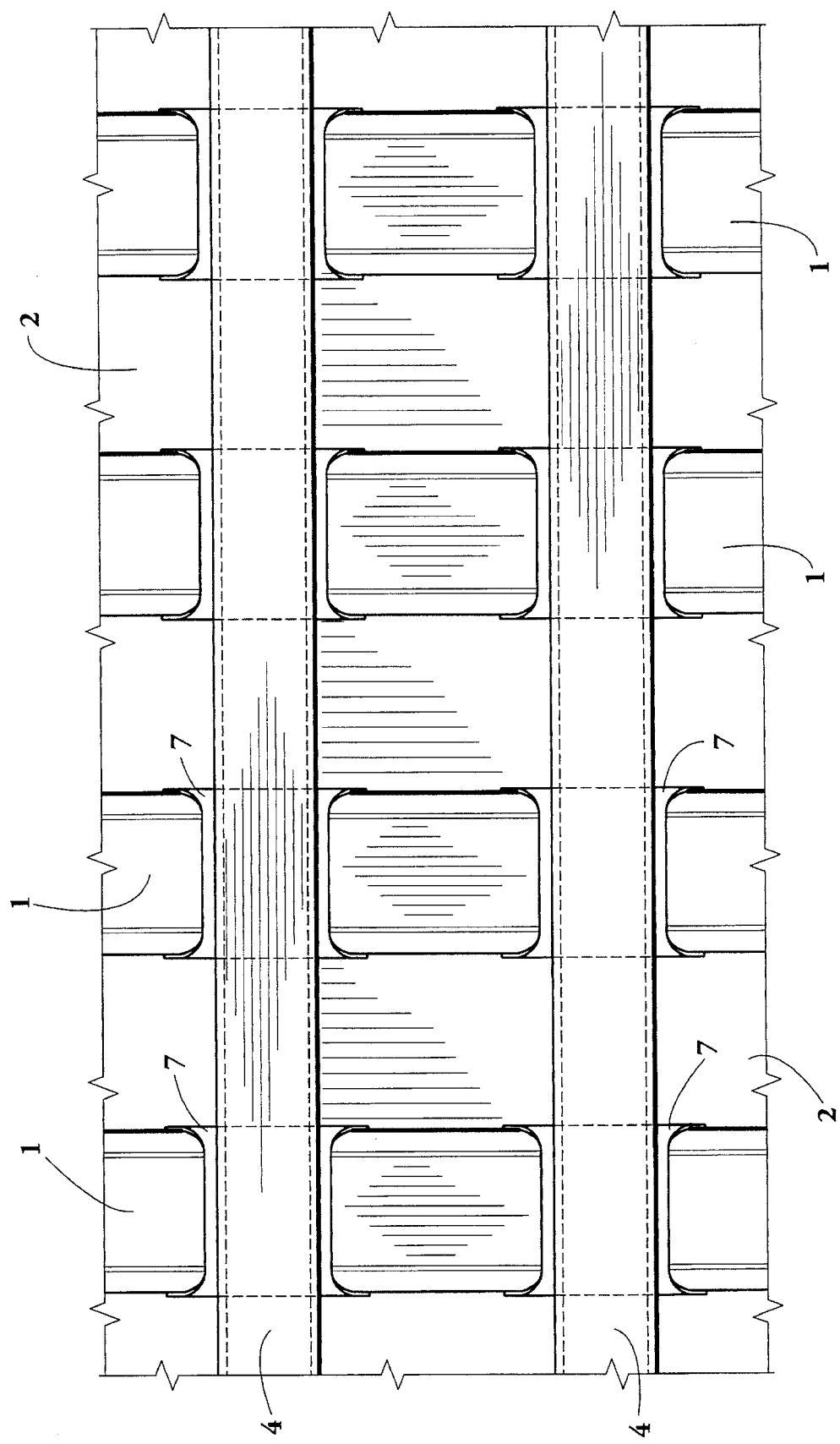
FIG. 4 is a plan view of a segment of the reinforced panel, showing the stiffening ribs over which are mounted saddles welded to the cut-outs in the transverse beams in accordance with the invention.

The typical panel structure consists of an elongated panel or deck plate to which have been attached reinforcing members. Reinforcing members are placed at spaced intervals along one horizontal axis of the panel structure. Additional reinforcing members are placed at spaced intervals along the other horizontal axis at an angle to the first horizontal axis of the panel structure, forming a grid like support. In this manner the deck plate may be made of thinner material and be lighter in weight and yet provide equivalent or greater support for loads or other stresses on the panel structure.

The first horizontal axis reinforcing members are referred to as stiffening ribs and for optimum panel structure efficiency, that is, greater strength for lowest weight, the ribs are shaped from flat material into a formed channel. In cross-section the channel would look like a trough with its top edges welded to the deck plate it is supporting. The supporting cross-members, referred to as transverse beams are formed similarly out of flat material, but are shaped to have a larger cross-section, e.g. a deeper trough, then the stiffening ribs. The transverse beams also have the top edges of the trough welded to the deck plate. In order for the transverse beams to fit over the stiffening ribs, cut-outs must be provided over said stiffening ribs. The transverse beams are then welded to the stiffening ribs at the cut-outs edges.

FIG. 1 shows the prior art with a stiffening rib 1, in the form of a channel, shown in cross-section, welded to a deck plate 2 at the top edges of the trough 3. FIG. 1 also shows a side view of a transverse beam 4 which is welded at cut-out 5 to stiffening rib 1. The top edge of the transverse beam is welded to the deck plate at 6. A crack 4A is shown to illustrate the point of abnormally high stress and sensitivity to fatigue failure of transverse beam 4.

FIG. 4 shows the present invention where saddles 7, welded to the transverse beams along the edge of the transverse beam cut-outs, are mounted over stiffening ribs 1 and welded to base plate 2 along their top edges. In the prior design the transverse beams were welded to the stiffening ribs at their junction over the cut-outs. In the invention there is no direct weld between the transverse beam and the stiffening rib, the saddle providing the reinforcing support and yet isolating the stresses between the two cross-support members.

FIG. 2 shows the present invention with a stiffening rib 1 in cross-section shown welded to the deck plate 2 at the top edges of the trough 3. FIG. 2 also shows the side view of a transverse beam 4 whose cut-out 5 is welded to a saddle 7, shown here from an end view. The top edges of the saddle 7, are shown welded to the deck plate 2 at 8. By use of the saddle 7, there is a nominal gap 9 between it and the stiffening rib 1.

FIG. 3 shows a side view of a longer piece of the transverse beam 4, covering three adjacent stiffening ribs 1, shown in cross-section. The saddles 7, which are intended to fit over the stiffening ribs 1, are shown in end view. The nominal gap between the saddle 7 and the stiffening rib 1, is represented by the space 9.

Figure 5:
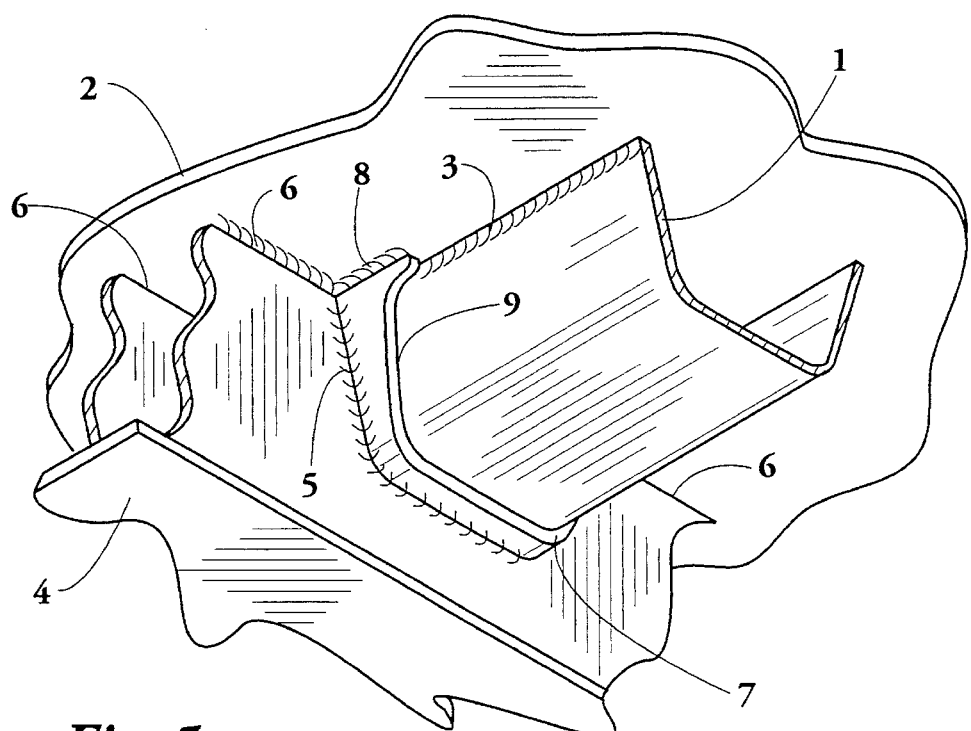
FIG. 5 illustrates the detail in perspective view of a transverse beam passing over a stiffening rib with the gap between the stiffening rib and the saddle, in accordance with the invention.

FIG. 5 shows a detailed perspective view of the intersection of the transverse beam and the stiffening rib. The stiffening rib 1 is welded to the deck plate 2 along the top edges 3 of the trough. The saddle 7 which is designed to fit over the stiffening rib 1 is welded to the transverse beam 4 along the transverse beam cut-out 5. The saddle 7 is also welded along its top edges 8 to the deck plate 2, as is the transverse beam 4, along its top edges 6. Note that a nominal gap exists between the stiffening rib and the saddle.

Figure 6:
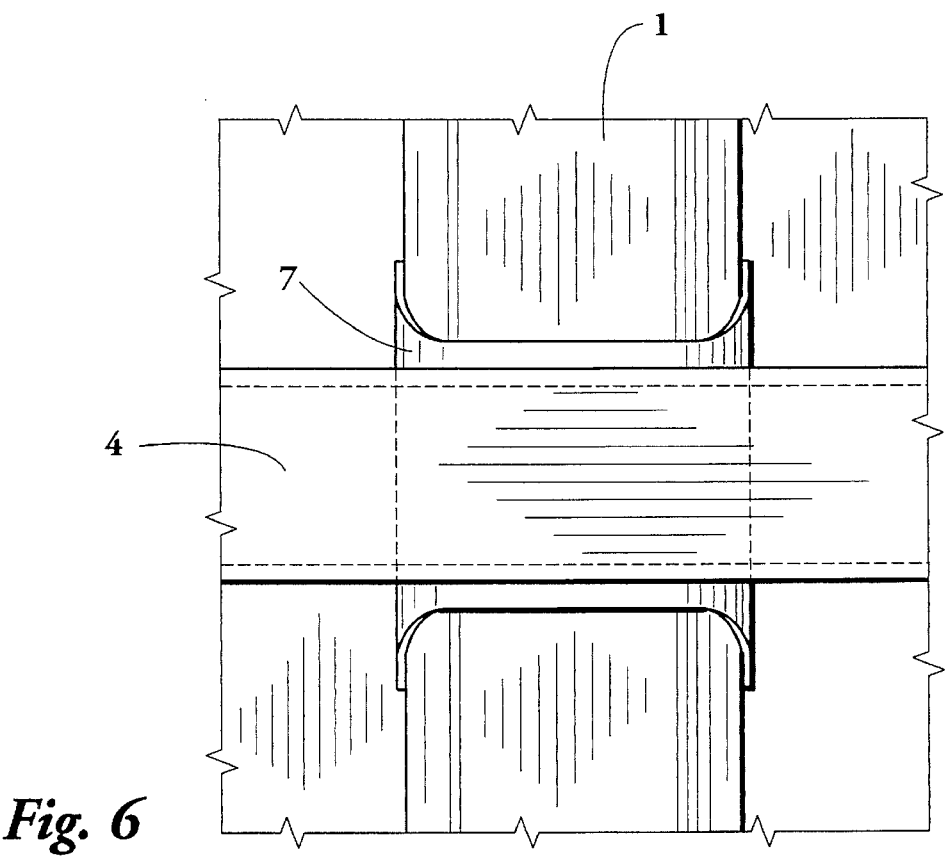
FIG. 6 is an enlarged partial view of the reinforced panel as seen in FIG. 4. This Figure illustrates the details of the transverse beam, saddle and stiffening rib interface in accordance with the invention.

FIG. 6 shows an enlarged partial view of the reinforced panel as seen in FIG. 4. Specifically, FIG. 6 is a plan view of the intersection of two reinforcing members where stiffening rib 1 passes through a cut-out in a transverse beam to which is welded a saddle 7.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Whereas, the present invention has been described in relation to the drawings attached hereto, it should be understood that other and further modifications, apart from those shown or suggested herein, may be made within the spirit and scope of this invention.

What is claimed is:

1. A cross-stiffened panel structure comprising:

a deck plate;

a plurality of stiffening ribs welded in spaced apart relationship to said deck plate;

a plurality of transverse beams, said transverse beams each having cut-outs shaped to fit over the external contour of said stiffening ribs; and a saddle being welded to each said cut-out on said transverse beams, said transverse beams and said saddles being welded to said deck plate, said cut-outs and said saddles being dimensioned so that a nominal gap is maintained between each said saddle and said stiffening ribs.

2. A cross-stiffened panel structure comprising:

a deck plate;

a plurality of stiffening ribs welded in spaced apart relationship to said deck plate;

a plurality of transverse beams, each having cut-outs shaped to fit over the external contour of said stiffening ribs, the transverse beams being welded to said deck plate except at said cut-outs; and a reinforcing support means welded to said transverse beams at each of said cutouts and to said deck plate, said reinforcing support means being dimensioned so that a nominal gap is maintained between each said reinforcing support means and said stiffening ribs.

\* \* \* \* \*